United States Patent
Lee et al.

(10) Patent No.: US 8,649,374 B2
(45) Date of Patent: Feb. 11, 2014

(54) STRUCTURE OF EFFICIENT SIGNALING HEADER IN BROADBAND WIRELESS ACCESS SYSTEM

(75) Inventors: Eun Jong Lee, Anyang-si (KR); Youngsoo Yuk, Anyang-si (KR); Yongho Kim, Anyang-si (KR); Kiseon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 77 days.

(21) Appl. No.: 13/320,745

(22) PCT Filed: May 17, 2010

(86) PCT No.: PCT/KR2010/003113
§ 371 (c)(1),
(2), (4) Date: Jan. 20, 2012

(87) PCT Pub. No.: WO2010/131935
PCT Pub. Date: Nov. 18, 2010

(65) Prior Publication Data
US 2012/0113877 A1    May 10, 2012

Related U.S. Application Data

(60) Provisional application No. 61/178,499, filed on May 15, 2009.

(30) Foreign Application Priority Data

May 17, 2010    (KR) .......................... 10-2010-0045979

(51) Int. Cl.
*H04L 12/28*    (2006.01)

(52) U.S. Cl.
USPC .......................................................... 370/389

(58) Field of Classification Search
USPC .......... 370/310, 315, 328, 470, 389; 455/450, 455/509; 714/748, 749, 750
See application file for complete search history.

(56) References Cited

U.S. PATENT DOCUMENTS

| | | | |
|---|---|---|---|
| 7,327,726 B2 * | 2/2008 | Kye | 370/389 |
| 2003/0035383 A1 | 2/2003 | Hershey | |
| 2007/0167140 A1 | 7/2007 | Grandhi et al. | |
| 2009/0241007 A1 * | 9/2009 | Hong et al. | 714/752 |
| 2012/0236780 A1 * | 9/2012 | Tao et al. | 370/315 |

* cited by examiner

*Primary Examiner* — Dady Chery
(74) *Attorney, Agent, or Firm* — Lee, Hong, Degerman, Kang & Waimey

(57) ABSTRACT

The present invention relates to a broadband wireless access system, and more specifically, to a structure of an efficient signaling header. A medium access control protocol data unit (MAC PDU) including a medium access control header (MAC header) is proposed; the MAC header including a flow identifier field, an extended header field, and a length field. When the MAC header is a signaling header, the flow identifier field is set to a specific value indicating that the MAC header is the signaling header, and the extended header field and the length field include signaling content information. But, when the MAC header is not the signaling header, the flow identifier field is set to value other than the specific value, the extended header field indicates whether or not an extended header is included in the MAC PDU, and the length field indicates the length of the MAC PDU.

15 Claims, 7 Drawing Sheets

FIG. 9

| Flow ID (4) = 0b1111 | Sign (1) | BR size (3) |
|---|---|---|
| BR size (8) | | |
| Signaling header type (TBD) = Banwidth Request | STID (4) | |
| STID (8) | | |
| FID (4) | TBD (4) | |

FIG. 10

| Flow ID (4) = 0b1111 | Sign (1) | BR size (3) | |
|---|---|---|---|
| BR size (8) | | | |
| Signaling header type (TBD) = Banwidth Request | Scheduling Type (3) | Priority (1) | |
| STID (8) | | | |
| FID (4) | TBD (4) | | |

STRUCTURE OF EFFICIENT SIGNALING HEADER IN BROADBAND WIRELESS ACCESS SYSTEM

CROSS-REFERENCE TO RELATED APPLICATIONS

This application is the National Stage filing under 35 U.S.C. 371 of International Application No. PCT/KR2010/003113, filed on May 17, 2010, which claims the benefit of earlier filing date and right of priority to Korean Application No. 10-2010-0045979, filed on May 17, 2010, and also claims the benefit of U.S. Provisional Application Ser. No. 61/178,499, filed on May 15, 2009.

TECHNICAL FIELD

The present invention relates to a broadband wireless access system and more particularly to a more efficient signaling header structure and a method for transmitting and receiving data using the same.

BACKGROUND ART

First, a protocol layer model defined in a general broadband wireless access system is described as follows before a Medium Access Control (MAC) header is explained.

FIG. 1 illustrates a protocol layer model defined in a wireless mobile communication system which is based on a generally used IEEE 802.16 system.

Referring to FIG. 1, a MAC layer belonging to a link layer may include three sublayers. A service-specific Convergence Sublayer (CS) may convert or map external network data, which is received through a CS Service Access Point (SAP), into MAC Service Data Units (SDUs) of a MAC Common Part Sublayer (CPS). This layer may have a function to classify SDUs of an external network and to associate each SDU with a corresponding MAC Service Flow IDentifier (SFID) and Connection IDentifier (CID).

The MAC CPS is a layer that provides a core MAC function such as system access, bandwidth allocation, connection setup, and connection management and receives data which is classified by a specific MAC connection from various CSs through the MAC SAP. Here, Quality of Service (QoS) may be applied to scheduling and data transmission through a physical layer.

A security sublayer may provide an authentication function, a secure key exchange function, and an encryption function.

The MAC layer provides a connection-oriented service and is implemented as a transport connection. When a mobile station (MS) is registered in a system, a service flow may be defined by negotiation between the MS and the system. If service requirements change, a new connection may be established. The transport connection defines mapping between peer convergence processes that utilize MAC and a service flow. The service flow defines QoS parameters of a MAC PDU exchanged in a corresponding connection.

A service flow for a transport connection performs a core role in operating the MAC protocol and provides a mechanism for uplink and downlink QoS management. In particular, the service flow may be combined with a bandwidth allocation process.

In a general IEEE 802.16 system, an MS may have a 48-bit universal MAC address per radio interface. This address uniquely defines the radio interface of the MS and may be used to establish a connection with the MS during an initial ranging process. Since a Base Station (BS) verifies MSs using different IDs of the MSs, the universal MAC address may be used as part of an authentication process.

Each connection may be identified by a 16-bit Connection IDentifier (CID). During initialization of an MS, two pairs of management connections (uplink and downlink) are established between the MS and the BS and three pairs including the management connections may optionally be used.

In the above layer structure, transmitting and receiving ends may exchange data and control messages through a Medium Access Control Packet Data Unit (MAC PDU). To generate such a MAC PDU, the BS or MS may incorporate a MAC header into the MAC PDU.

The MS may request an uplink bandwidth by transmitting bandwidth request information in a MAC signaling header format or a MAC subheader format. Here, the MS requests an uplink bandwidth for each connection between the MS and the BS. The following is a description of a general header.

FIG. 2 illustrates an example of a MAC header format used in a wireless MAN mobile communication system which is based on the IEEE 802.16 system. In this specification, one gradation of a block indicating a header structure including the structure of FIG. 2 denotes one bit and one row denotes one byte, and the bits, starting at the top from the Most Significant Bit (MSB) and ending at the bottom with the Least Significant Bit (LSB), are sequentially arranged.

Referring to FIG. 2, six subheaders may be used for a MAC PDU together with a generic MAC header (GMH). Subheaders for each MAC PDU are inserted in the MAC PDU at the rear of the generic MAC header. Each field included in the MAC header is described as follows.

A Header Type (HT) field represents a header type, more particularly represents whether a corresponding MAC PDU includes a generic MAC header, which is followed by a payload in the MAC PDU, or a signaling header for control of bandwidth request (BR) or the like. An Encryption Control (EC) field represents encryption control, more particularly represents whether a payload has been encrypted. A Type field represents the presence or absence of a subheader suffixed to the header and the type of the subheader. An Extended Subheader Field (ESF) field represents the presence or absence of an extended subheader suffixed to the header.

A CRC Indication (CI) field represents whether a CRC is suffixed to the rear of payload. An Encryption Key Sequence (EKS) field represents an encryption key sequence number used for encryption when the payload is encrypted. A length (LEN) field represents the length of the MAC PDU. A CID field represents a connection identifier of a connection for transferring the MAC PDU. A connection is used as an identifier of a MAC layer for data and message transmission between the BS and the MS. A CID is used to identify a specific MS or a specific service between the BS and the MS. A Header Check Sequence (HCS) is used to detect an error in the header. In FIG. 2, a number in parentheses next to each field name represents the number of bits occupied by each field.

FIG. 3 illustrates MAC signaling header type 1 which is used in a wireless MAN mobile communication system which is based on a generally used IEEE 802.16 system.

As shown in FIG. 3, in the signaling header type 1, a header type (HT) field value is set to 1 and an encryption control (EC) field value is set to 0 since the signaling header type 1 is a signaling header. The following Table 1 shows details of the type field.

TABLE 1

| Type field (3 bits) | MAC header type (with HT/EC = 0b10) |
|---|---|
| 000 | BR incremental |
| 001 | BR aggregate |
| 010 | PHY channel report |
| 011 | BR with UL Tx power report |
| 100 | BR and CINR report |
| 101 | BR with UL sleep control |
| 110 | SN Report |
| 111 | CQICH allocation request |

As shown in Table 1, a header content field has a different format according to the value of the type field. For example, when the type field has a value of "000" or "001", the MAC signaling header is used as a Bandwidth Request (BR) header. The format of the header in this case is described below with reference to FIG. 4.

FIG. 4 illustrates an example of a bandwidth request header that is transmitted to a BS when an MS requests a bandwidth in the IEEE 802.16 system.

The following Table 2 shows details of fields included in the bandwidth request header shown in FIG. 4.

TABLE 2

| Name | Length (bits) | Description |
|---|---|---|
| BR | 19 | Indicates the size of an uplink bandwidth that an MS requests for a corresponding CID. The request is not affected by physical layer modulation or encoding. |
| CID | 16 | Connection Identifier |
| EC | 1 | Set to 0 in a signaling header. |
| HCS | 8 | Header Check Sequence |
| HT | 1 | Set to 1 since it is a signaling header. |
| Type | 3 | Indicates the type of the bandwidth request header. |

The MS can request up to 512 KB when requesting an uplink bandwidth using the header as shown in FIG. 4.

DISCLOSURE

Technical Problem

An object of the present invention devised to solve problems of the related art described above lies in a more efficient signaling header.

Another object of the present invention lies in providing a signaling header that maintains a general header format having a size of 2 bytes in order to increase the performance of decoding of MAC headers.

Objects of the present invention are not limited to those described above and other objects will be clearly understood by those skilled in the art from the following description.

Technical Solution

A method for a transmitting end to transmit data to a receiving end in accordance with an embodiment of the present invention to achieve the above objects may include generating a Medium Access Control Protocol Data Unit (MAC PDU) including a MAC header, and transmitting the MAC PDU to the receiving end, wherein the MAC header may include a first flow identifier (ID) field, an extended header field indicating whether or not the MAC PDU is followed by an extended header, and a length field indicating a length of the MAC PDU. Here, when the MAC header is a signaling header, the first flow ID field may be set to a specific value indicating that the MAC header is the signaling header and signaling contents information may be included in the extended header field and the length field.

A method for a receiving end to receive data from a transmitting end in accordance with an embodiment of the present invention to achieve the above objects may include receiving a Medium Access Control Protocol Data Unit (MAC PDU) including a MAC header from the transmitting end, and decoding the MAC PDU, wherein the MAC header includes a first flow identifier (ID) field, an extended header field indicating whether or not the MAC PDU is followed by an extended header, and a length field indicating a length of the MAC PDU. Here, it is preferable that the MAC PDU be decoded such that, when the first flow ID field has been set to a specific value indicating that the MAC header is the signaling header, values of the extended header field and the length field are identified as signaling contents information.

A reception apparatus that operates in a broadband wireless access system in accordance with an embodiment of the present invention to achieve the above objects may include a processor, and a radio frequency (RF) module for receiving a Medium Access Control Protocol Data Unit (MAC PDU) including a MAC header from a transmitting end, wherein the MAC header includes a first flow identifier (ID) field, an extended header field indicating whether or not the MAC PDU is followed by an extended header, and a length field indicating a length of the MAC PDU. Here, it is preferable that the processor perform a control operation such that values of the extended header field and the length field are identified as signaling contents information when the first flow ID field has been set to a specific value indicating that the MAC header is the signaling header.

In the above embodiments, the MAC header may further include a type field indicating a type of the signaling header.

In addition, when the MAC header is a bandwidth request (BR) header, the signaling header may further include at least one of a station ID field indicating a station ID of the transmitting end and a second flow ID field indicating a flow ID of a requested bandwidth.

Further, it is preferable that a total size of the first flow ID field, the extended header field, and the length field be 2 bytes.

It is also preferable that the specific value indicating that the MAC header is the signaling header be '0b0001'.

Advantageous Effects

The embodiments of the present invention have the following advantages.

First, it is possible to perform more efficient communication by using the MAC signaling header provided according to the embodiments of the present invention.

Second, it is possible to achieve decoding gain since the format of the MAC signaling header provided according to the embodiments of the present invention is kept the same as the basic format of the conventional MAC header.

Advantages of the present invention are not limited to those described above and other advantages will be clearly understood by those skilled in the art from the following description.

DESCRIPTION OF DRAWINGS

FIG. 9 illustrates an exemplary header structure when a signaling header according to an embodiment of the present invention is used for bandwidth request of a flow unit.

FIG. 10 illustrates an exemplary header structure when a signaling header according to an embodiment of the present invention is used for bandwidth request of a Quality of Service (QoS) unit.

BEST MODE

Figure 1:
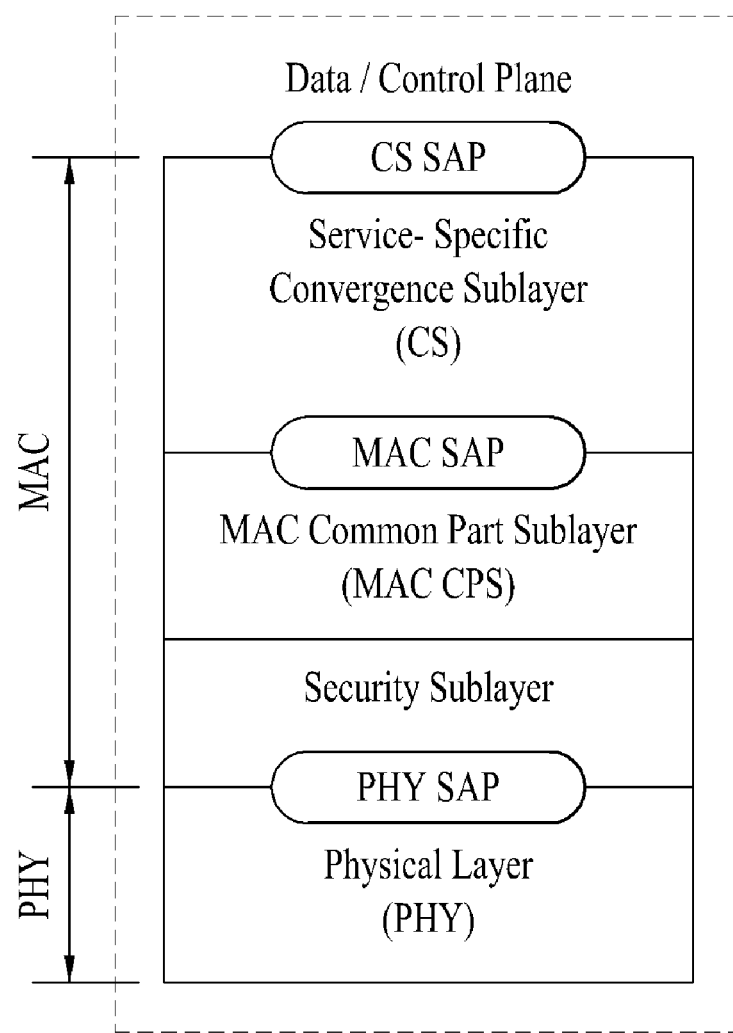
FIG. 1 illustrates a hierarchical structure of a general IEEE 802.16 system.
Figure 2:
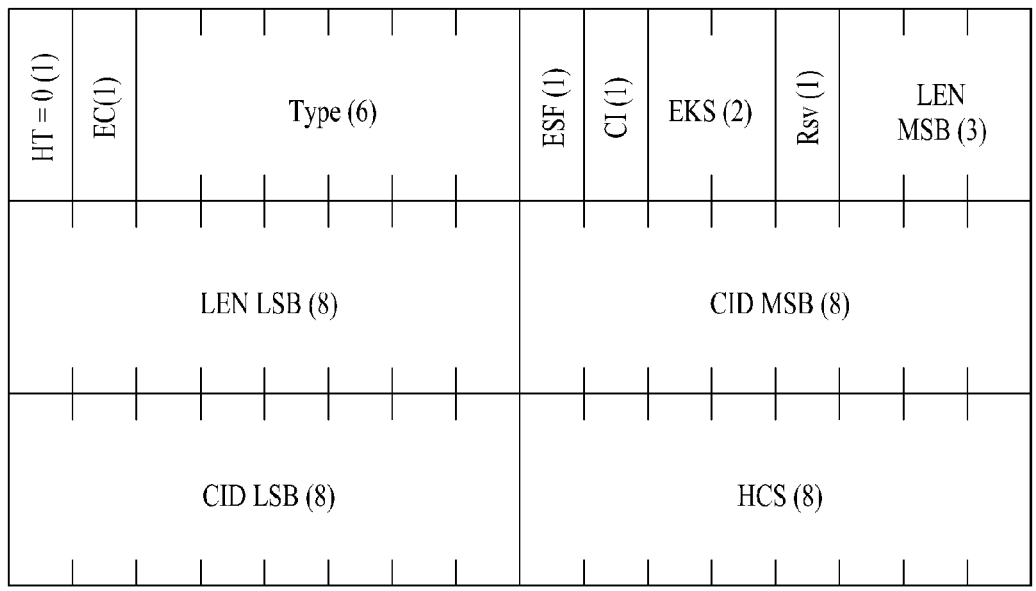
FIG. 2 illustrates an example of a MAC header format used in a wireless MAN mobile communication system which is based on the IEEE 802.16 system.
Figure 3:
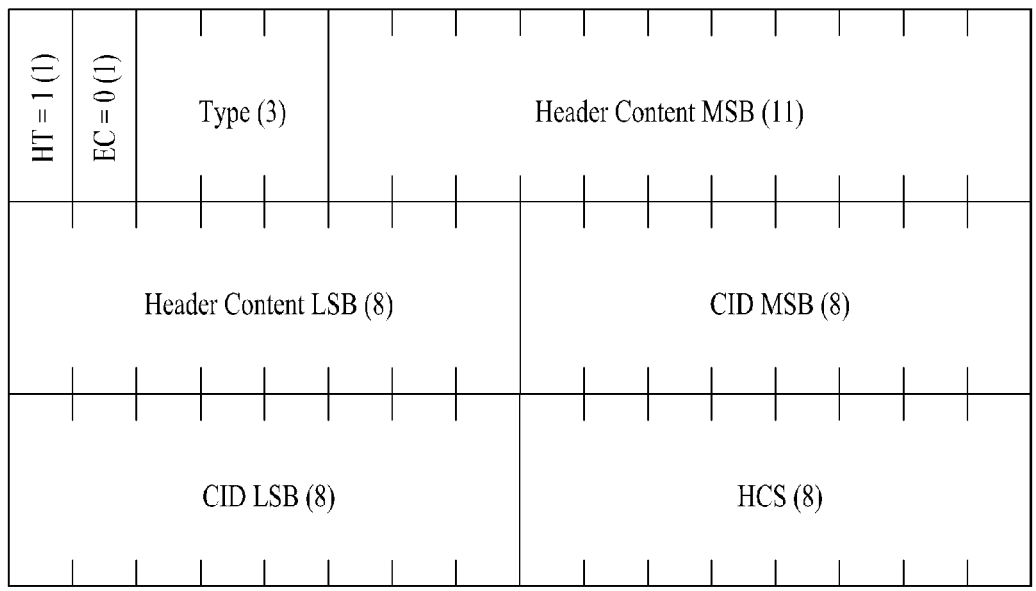
FIG. 3 illustrates MAC signaling header type 1 which is used in a wireless MAN mobile communication system which is based on a generally used IEEE 802.16 system.
Figure 4:
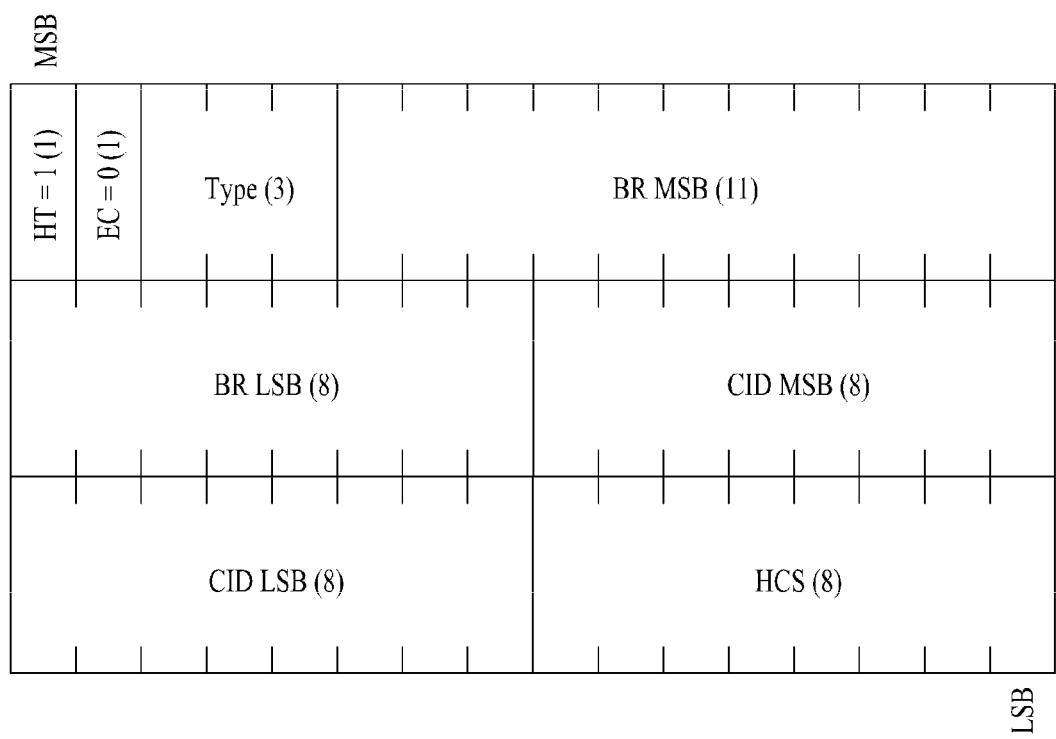
FIG. 4 illustrates an example of a bandwidth request header that is transmitted to a BS when an MS requests a bandwidth in the IEEE 802.16 system.

The present invention provides a procedure and apparatus for performing more efficient handover in order to achieve the objects described above.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. Here, the term "base station (BS)" may be replaced with another term such as "fixed station", "Node B", "eNode B (eNB)", "Access Point (AP)", or "Advanced BS (ABS)". The term "terminal" may also be replaced with another term such as "User Equipment (UE)", "Mobile Station (MS)", "Mobile Subscriber Station (MSS)", "Advanced MS (AMS)", or "Subscriber Station (SS)".

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents. Especially, the embodiments of the present invention can be supported by one or more of P802.16-2004, P802.16e-2005, P802.16Rev2, and IEEE P802.16m which are standard documents of the IEEE 802.16 system.

Specific terms used in the following description are provided for better understanding of the present invention and can be replaced with other terms without departing from the spirit of the present invention.

The following is a description of a generic MAC header structure used in the IEEE 802.16m system.

Figure 5:
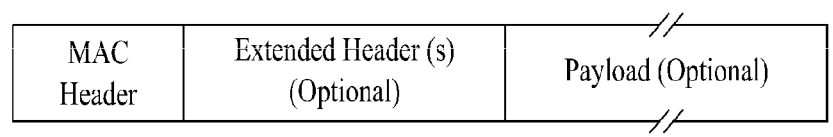
FIG. 5 illustrates a general format of a Medium Access Control Protocol Data Unit (MAC PDU) that is used in the IEEE 802.16m system.

FIG. 5 illustrates a general format of a Medium Access Control Protocol Data Unit (MAC PDU) that is used in the IEEE 802.16m system.

As shown in FIG. 5, a MAC PDU may include a MAC header, an extended header, and a payload. The MAC header is always included in the MAC PDU and the payload may optionally be included in the MAC PDU as needed. However, the extended header is not included in the MAC PDU when no payload is included.

Figure 6:
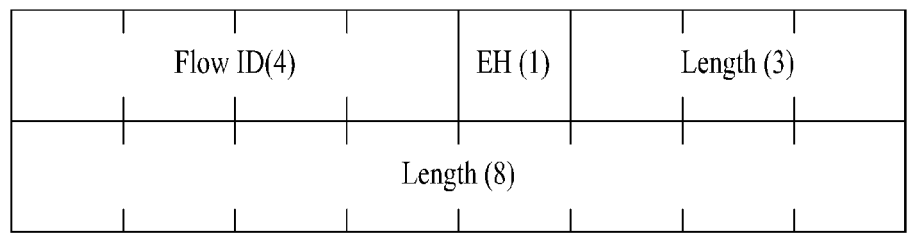
FIG. 6 illustrates an example of a Generic MAC Header (GMH) structure that can be applied to a general IEEE 802.16m system.

FIG. 6 illustrates an example of a Generic MAC Header (GMH) or Advanced Generic MAC Header (AGMH) that is applied to the IEEE 802.16m system.

The following is a description of each field included in the MAC header shown in FIG. 6.

First, a flow ID field may indicate a flow connection identifier of the GMH. An Extended Header (EH) field indicates whether or not the MAC header is followed by an extended header. A length field indicates the size of a payload which follows a MAC PDU or a MAC header.

When data is transmitted using a 2-byte GMH as shown in FIG. 6, it is possible to indicate, through an extended header (EH) field of the GMH, whether or not the MAC header is followed by an extended header and additional header information may be included in the MAC header through an extended header.

Figure 7:
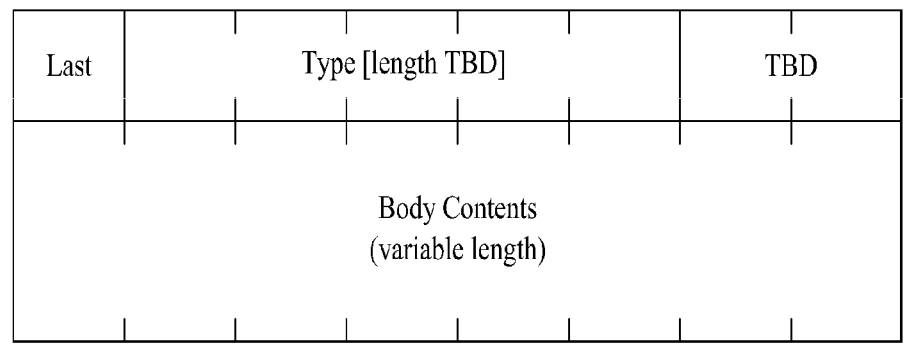
FIG. 7 illustrates an example of an extended header structure that can be applied to a general IEEE 802.16m system.

FIG. 7 illustrates an example of an extended header structure that can be applied to a general IEEE 802.16m system.

As shown in FIG. 7, the extended header includes a last field indicating whether or not the extended header is followed by an additional extended header which is of a different type from the extended header, a type field indicating the type of the example, and a body contents field that is defined according to each type.

In a conventional system such as the IEEE 802.16e system, data, which is transmitted through a MAC PDU including a header only without payload, is transmitted using the format of signaling header type 1 or 2. Such a signaling header may be indicated by the value of a Header Type (HT) defined in the first bit. However, in a system such as IEEE 802.16m, a 2-byte GMH is defined and a flow ID field is located at the first 4 bits. The flow ID field of such a GMH is currently defined such that two values of the flow ID field are reserved for a message that is transmitted through a management connection. However, these are all associated with headers of MAC PDUs in which a payload is transmitted. While headers of MAC PDUs, which includes a payload, require both EH and length fields for data transmission, signaling headers for simple signaling without a payload may not need to include at least one of the EH and length fields.

That is, the MAC header does not require an extended header field when the MAC PDU includes no payload since the MAC header is not followed by an extended header as described above and the MAC header also does not require a length field when the MAC PDU includes a signaling header having a fixed size (according to type). Accordingly, in a system that is more advanced than IEEE 802.16e systems including the IEEE 802.16m system, there is a need to define a new format for a signaling header for transmitting signaling information based on the currently defined GMH.

The present invention suggests a new signaling header that can be efficiently transmitted in a system in which a MAC PDU is transmitted based on a 2-byte GMH as described above. Specifically, the present invention suggests that the structure of a signaling header transmitted from the transmitting end to the receiving end be changed such that a flow ID field included in a conventional 2-byte GMH is set to a specific value indicating that the header is a signaling header and EH and length fields of the GMH include contents of the signaling header.

When such a signaling header is used, the receiving end performs a decoding procedure in the following manner. That is, when the receiving end receives a 2-byte GMH, first, the receiving end checks a flow ID field in the GMH. Here, when the value of the flow ID field has been set to a value indicating that the header is a signaling header, the receiving end can determine that an additional field including signaling-related information (i.e., header contents) follows. Accordingly, the receiving end may analyze a GMH in a new way such that the receiving end checks a signaling header type field subsequent to the first 2 bytes and then determines that information, which is located in the first 2 bytes at a position corresponding to EH and length fields of the conventional GMH, is contents of a signaling header according to the value of the signaling header type field.

This signaling header structure is described below with reference to FIG. 8.

Figure 8:
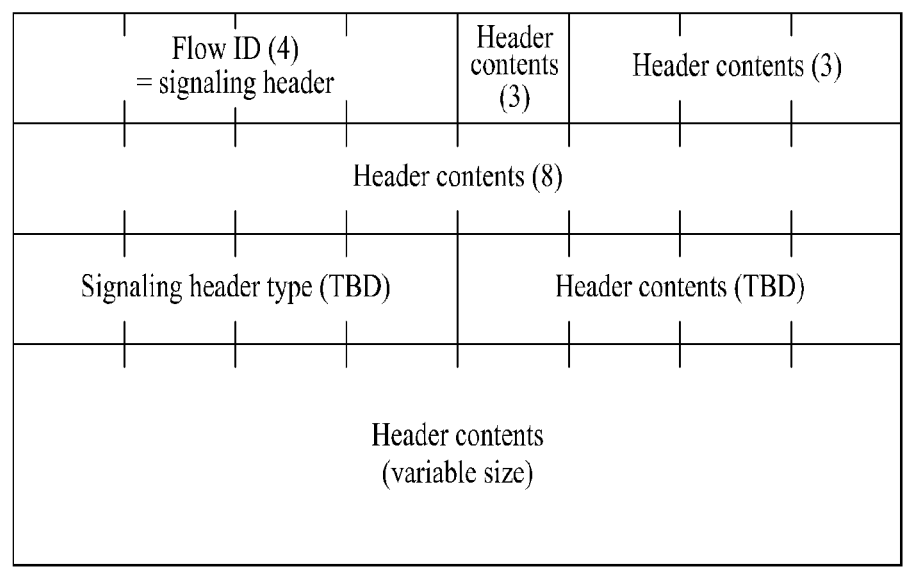
FIG. 8 illustrates an example of a signaling header structure according to an embodiment of the present invention.

FIG. 8 illustrates an example of a signaling header structure according to an embodiment of the present invention.

As shown in FIG. 8, the structure of the first 2 bytes of the signaling header according to the present invention is similar to that of a conventional GMH. However, the flow ID field is set to a specific value (for example, 0b1111 or 1b0001) that has been reserved to indicate the signaling header, regardless of a flow ID (FID) that is to be signaled through the header. This allows the function of the header type (HT) field to be replaced by the flow ID (FID) field. In addition, bits corresponding to the EH and length fields among the fields of the conventional 2-byte GMH are replaced with header contents.

The first 2 bytes are followed by a signaling header type field which indicates the type of the signaling header and the remaining fields may be used as header contents fields. Here, each header contents field may have a different fixed size according to the header type and may also have the same size regardless of the header type. The header contents field may include header contents that are continuous to header contents included in the first 2 bytes.

Here, the header type field may be defined as shown in the following Table 3.

TABLE 3

| Type field (4 bits) | MAC Signaling Header Type |
|---|---|
| 0000 | BR with STID |
| 0001 | BR without STID |
| 0010 | Service Specific Scheduling Control Header |
| 0011 | Sleep Control |
| 0100 | AMS Battery Layer Report |
| 0101 | Uplink Power Status Report |
| 0110-1111 | Reserved |

As shown in Table 3, the header type field may be set to a 4-bit size and a total of 6 type values "0000" to "0101" may be defined and the remaining bit values are reserved.

The following is a description of detailed formats of a signaling header according to the present invention.

FIG. 9 illustrates an exemplary header structure when a signaling header according to an embodiment of the present invention is used for bandwidth request of a flow unit.

As shown in FIG. 9, the first 2 bytes of a signaling header for Bandwidth Request (BR) may include a flow ID field that is set to a specific value (for example, 0b0001 or 0b1111) indicating that the header is a signaling header, a sign field indicating the BR type (0: incremental, 1: aggregated), and a BR size indicating the size of the requested bandwidth.

Subsequent to the first 2 bytes, the signaling header may include a signaling header type field set to a value (for example, 0b0001) indicating that the header is a contention-based bandwidth request header, a station ID field, a flow ID (FID) field indicating a flow whose bandwidth is requested, and the like. The FID field may be referred to as a bandwidth request flow ID (BR FID) field. 4 bits that are left for byte alignment may be used as a field that is continuous to a BR size field included in the first 2 bytes such that a total of 16 bits are used as the BR size field. One byte may be added to the 5 bytes shown in FIG. 8. In this case, a total of 19 bits may be used as the BR size field.

FIG. 10 illustrates an exemplary header structure when a signaling header according to an embodiment of the present invention is used for bandwidth request of a Quality of Service (QoS) unit.

Although the signaling header shown in FIG. 10 is similar to the signaling header shown in FIG. 9, the signaling header of FIG. 10 further includes a scheduling type field that indicates the scheduling type since the header is a BR header of a QoS unit. Here, a scheduling type field value of 000 indicates a UGS type, 001 indicates rtPS type, 010 indicates ertPS type, 011 indicates nrtPS type, and 100 indicates BE type and the remaining values 101 to 111 may be reserved. The signaling header may further include a priority field indicating priority of the bandwidth request. The scheduling type field and/or the priority field may be included in the first 2 bytes of the scheduling header as shown in FIG. 10 and may also be located at a different position.

The signaling header structures according to the present invention described above are characterized in that the signaling header structures minimize overhead while maintaining the currently defined 2-byte GMH format. Accordingly, there is an advantage in that the format of the first 2 bytes of the header is kept the same as the format of the GMH in the system in which a MAC PDU is transmitted based on a 2-byte GMH, thereby achieving decoding gain.

MS and BS Structure

The following is a description of an MS and a BS (for example, a Femto-cell BS (FBS) or a Macro-cell BS (MBS)) according to another embodiment of the present invention, which can perform the embodiments of the present invention.

The MS may operate as a transmitter in uplink and operate as a receiver in downlink. The BS may operate as a receiver in uplink and operate as a transmitter in downlink. That is, each of the MS and the BS may include a transmitter and a receiver for transmitting information or data.

The transmitter and the receiver may include a processor, a module, a portion, and/or a means for performing the embodiments of the present invention. Specifically, the transmitter and the receiver may include a module (means) for encrypting a message, a module for analyzing an encrypted message, an antenna for transmitting and receiving a message, and the like. An example of the transmitter (i.e., transmitting end) and the receiver (i.e., receiving end) is described below with reference to FIG. 11.

Figure 11:
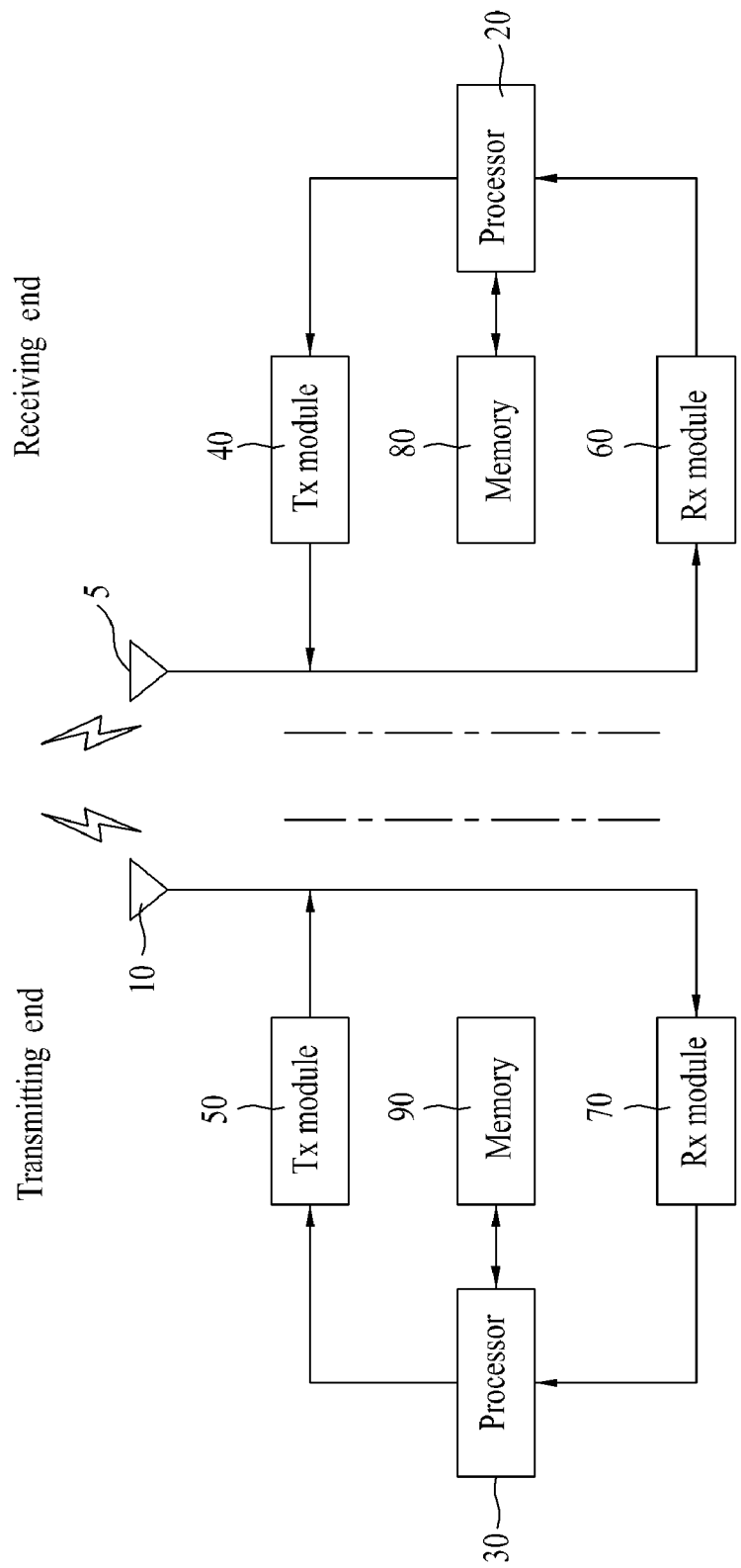
FIG. 11 is a block diagram illustrating exemplary structures of a transmitting end and a receiving end according to another embodiment of the present invention.

FIG. 11 is a block diagram illustrating exemplary structures of a transmitting end and a receiving end according to another embodiment of the present invention.

The left side of FIG. 11 shows the structure of the transmitting end and the right side shows the structure of the receiving end. Each of the transmitting end and the receiving end may include antennas 5 and 10, processors 20 and 30, transmission modules (Tx modules) 40 and 50, reception modules (Rx modules) 60 and 70, and memories 80 and 90, respectively. Each pair of components may perform a corresponding function. The following is a detailed description of each component.

The antennas 5 and 10 function to transmit signals generated by the transmission modules 40 and 50 to the outside or to receive and deliver a radio signal from the outside to the reception modules 60 and 70, respectively. Each of the MS and the BS may include two or more antennas when a multiple antenna (MIMO) function is supported.

The antenna, the transmission module, and the reception module may constitute a radio frequency (RF) module.

The processors 20 and 30 generally control overall operation of the MS and the BS, respectively. For example, each of the processors 20 and 30 may perform a control function for performing the embodiments of the present invention described above, a function to perform MAC frame variable control according to service characteristics and radio environments, a handover function, authentication and encryption functions, and the like.

When generating a signaling header, the processor of the transmitting end may set the value of a flow ID field in a first 2-byte region of the header to a value indicating that the signal is a signaling header and set the remaining fields to values indicating signaling header contents. The processor of the transmitting end may generate a MAC PDU using the signaling header and control the transmission module to transmit the MAC PDU to the receiving end.

The processor of the receiving end decodes the MAC PDU received from the transmitting end through the reception module. Here, when the value of a flow ID field included in the first 2 bytes of the header has been set to a specific value indicating that the header is a signaling header, the processor of the receiving end may identify values of the remaining fields as contents of the signaling header rather In addition, the processor of the transmitting/receiving end may perform overall control associated with operations and procedures described in the above embodiments.

The transmission modules 40 and 50 may perform coding and modulation of data, which has been scheduled by the processors 20 and 30 to be transmitted to the outside, and may then deliver the resulting data to the antennas 5 and 10.

The reception modules 60 and 70 may perform decoding and demodulation upon radio signals received from the outside through the antennas 5 and 10 to restore the radio signals into original data and may then deliver the original data to the processors 20 and 30, respectively.

The memories 80 and 90 may store programs for processing and control by the processors 20 and 30 and may also temporarily store input/output input and output data items such as a CRID. The memories 80 and 90 may include a storage medium of at least one of a flash memory type, a hard disk type, a multimedia card micro type, a card type (for example, SD or XD memory), Random Access Memory (RAM) Static Random Access Memory (SRAM), Read-Only Memory (ROM), Electrically Erasable Programmable Read-Only Memory (EEPROM), Programmable Read-Only Memory (PROM), a magnetic memory, a magnetic disc, and an optical disc.

The BS may perform, through at least one of the modules described above, a control function for performing the embodiments of the present invention described above, Orthogonal Frequency Division Multiple Access (OFDMA) packet scheduling, Time Division Duplex (TDD) packet scheduling, and channel multiplexing functions, a function to perform MAC frame variable control according to service characteristics and radio environments, a high-speed traffic real-time control function, a handover function, authentication and encryption functions, a packet modulation/demodulation function for data transmission, a high-speed packet channel coding function, a real-time modem control function, and the like and may also additionally include a separate means, module, or portion for performing such functions.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention. In addition, claims which are not explicitly dependent on each other can be combined to provide an embodiment or new claims can be added through amendment after this application is filed.

INDUSTRIAL APPLICABILITY

Although the more efficient MAC signaling header structure in a broadband wireless access system according to the present invention has been described above with reference to an example in which the MAC signaling header structure is applied to the IEEE 802.16m system, the MAC signaling header structure may be applied not only to IEEE 802.xx systems but also to various other mobile communication systems.

The invention claimed is:

1. A method for a transmitting end to transmit data to a receiving end, the method comprising:
    generating a Medium Access Control Protocol Data Unit (MAC PDU) including a MAC header; and
    transmitting the MAC PDU to the receiving end,
    wherein the MAC header includes a first flow identifier (ID) field, an extended header field, and a length field,
    wherein, when the MAC header is a signaling header, the first flow ID field is set to a specific value indicating that the MAC header is the signaling header, and the extended header field and the length field indicate signaling contents information, and
    wherein, when the MAC header is not the signaling header, the first flow ID field is set to a value other than the specific value, the extended header field indicates whether the MAC PDU is followed by an extended header, and the length field indicates a length of the MAC PDU.

2. The method according to claim 1, wherein the MAC header further includes a type field indicating a type of the signaling header.

3. The method according to claim 2, wherein, when the signaling header is a bandwidth request (BR) header, the signaling header includes at least a station ID field indicating a station ID of the transmitting end or a second flow ID field indicating a flow ID of a requested bandwidth.

4. The method according to claim 2, wherein a total size of the first flow ID field, the extended header field, and the length field is 2 bytes.

5. The method according to claim 2, wherein the specific value indicating that the MAC header is the signaling header is '0b0001'.

6. A method for a receiving end to receive data from a transmitting end, the method comprising:
    receiving a Medium Access Control Protocol Data Unit (MAC PDU) including a MAC header from the transmitting end; and
    decoding the MAC PDU,
    wherein the MAC header includes a first flow identifier (ID) field, an extended header field, and a length field,
    wherein the MAC PDU is decoded such that,
        when the first flow ID field has been set to a specific value indicating that the MAC header is a signaling header, values of the extended header field and the length field are identified as signaling contents information, and
        when the first flow ID field has been set to a value other than the specific value, values of the extended header field are identified as information indicating whether the MAC PDU is followed by an extended header, and values of the length field are identified as information indicating a length of the MAC PDU.

7. The method according to claim 6, wherein the MAC header further includes a type field indicating a type of the signaling header.

8. The method according to claim 7, wherein, when the MAC header is a bandwidth request (BR) header, the signaling header includes at least a station ID field indicating a station ID of the transmitting end or a second flow ID field indicating a flow ID of a requested bandwidth.

9. The method according to claim 7, wherein a total size of the first flow ID field, the extended header field, and the length field is 2 bytes.

10. The method according to claim 7, wherein the specific value indicating that the MAC header is the signaling header is '0b0001'.

11. A reception apparatus that operates in a broadband wireless access system, the reception apparatus comprising:
    a processor; and
    a radio frequency (RF) module for receiving a Medium Access Control Protocol Data Unit (MAC PDU) including a MAC header from a transmitting end,
    wherein the MAC header includes a first flow identifier (ID) field, an extended header field, and a length field,
    wherein the processor performs a control operation such that:
    values of the extended header field and the length field are identified as signaling contents information when the first flow ID field has been set to a specific value indicating that the MAC header is a signaling header, and
    when the first flow ID field has been set to a value other than the specific value, values of the extended header field are identified as information indicating whether the MAC PDU is followed by an extended header, and values of the length field are identified as information indicating a length of the MAC PDU.

12. The reception apparatus according to claim 11, wherein the MAC header further includes a type field indicating a type of the signaling header.

13. The reception apparatus according to claim 12, wherein, when the MAC header is a bandwidth request (BR) header, the signaling header includes at least a station ID field indicating a station ID of the transmitting end or a second flow ID field indicating a flow ID of a requested bandwidth.

14. The reception apparatus according to claim 12, wherein a total size of the first flow ID field, the extended header field, and the length field is 2 bytes.

15. The reception apparatus according to claim 12, wherein the specific value indicating that the MAC header is the signaling header is '0b0001'.

* * * * *